Patented May 21, 1940

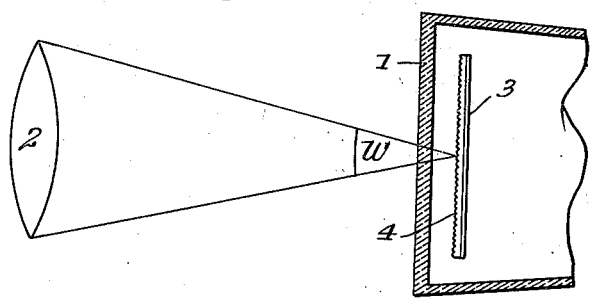
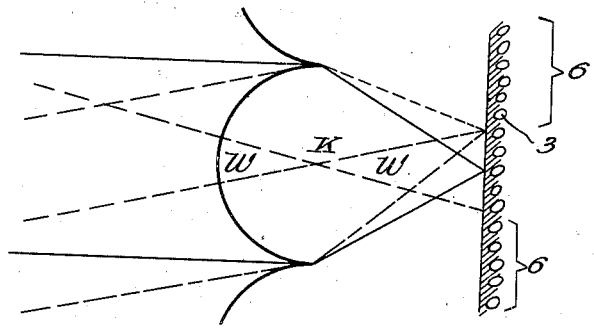
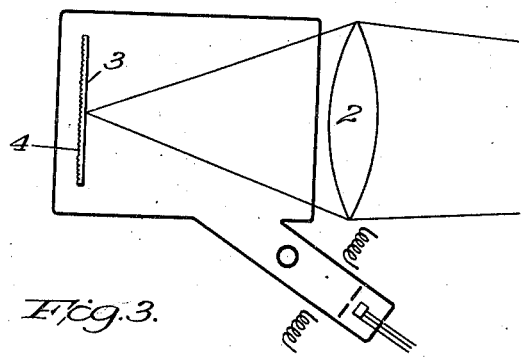

2,201,245

UNITED STATES PATENT OFFICE 2,201,245

CATHODE RAY PROJECTION TUBE

Ernst Ruska and Wilhelm Reichel, Berlin-Zehlendorf, and Rolf Colberg, Berlin-Dahlem, Germany, assignors to the firm Fernseh Aktien-Gesellschaft, Zehlendorf, near Berlin, Germany Application October 22, 1937, Serial No. 170,458
In Germany November 17, 1936

6 Claims. (Cl. 250—164)

This invention relates to cathode ray tubes, particularly to such where the recording produced by the cathode ray beam, for instance, a television image or oscillogram is projected upon a screen by means of an optical projection system. So far this system had the great disadvantage of very low efficiency, especially if the radiation in back of the fluorescent screen was made use of. In this case, only a very low percentage of the light could be utilized, even if large optical systems were employed for projection.

It is possible to increase the efficiency by placing a lens immediately in back of the fluorescent screen of the tube by which lens at least a somewhat larger portion of the light initially dispersing in all directions is gathered in a certain space angle, for instance, on a projection lens. The advantage thus obtained, however, is still comparatively small. According to the invention, better efficiency can be obtained by placing a screen composed of small optical systems parallel to the fluorescent screen of the cathode ray tube, by which optical screen the light radiation emanating from the fluorescent screen is concentrated. A further advantage of this system over a simple lens is that no curvature of the picture plane occurs. Thus, systems of great refracting power may be used. In television receiver tubes the size of the individual systems is chosen smaller or at the most equal to the elemental area of the image.

A screen of a geometrically defined pattern may be used for the execution of the invention, which screen then preferably consists of hexagonal optical systems which completely cover the area of the screen. Hexagons of the size of elemental picture areas are positioned in such a manner that two opposed sides of each hexagon are perpendicular to the direction of horizontal scanning.

If, however, very small optical systems are required, one will refrain from using a screen of defined geometry, and, for instance, use a smooth surface covered with a layer of a multitude of very small refracting elements. For this purpose, as is known for other purposes, minute glass droplets may be employed. However, it may be considered that the adhesive means for attaching these elements must be suitable in respect to vacuum technique and optical properties. The concentrating power depends on the refractive power of the adhesive means inasmuch as the light must penetrate the limiting surface between the adhesive means and the glass. A mica plate may also be used to suspend the layer.

When the light trespasses into a substance of comparatively high refractive power, such as glass, the density of radiation in the space angle taken up by the radiation is increased because the angle which the light ray forms with the normal, is, for instance, inside of glass, always smaller than outside of glass. A bundle of light rays incident upon a certain point of the limiting surface from all sides, thus with a space angle of 180°, is changed in a light ray with a space angle of less than 90° inside of the glass. By application of optical systems, according to the invention, this densification is utilized to increase the efficiency. It may be increased still further by using an adhesive means of low refractive power for the fluorescent layer.

The invention may be explained in detail with the aid of the drawing, showing several embodiments of the invention. In Figure 1 the end of the tube carrying the screen is indicated by 1. 2 indicates a projection objective; 3 is the fluorescent substance. 4 is a screen composed of a multitude of small lenses of, for instance, hemispherical shape, which is disposed in back of the fluorescent surface in close proximity thereof. In this case, the arrangement is made in such a manner that the radiation emanating from a luminescent point on the axis of an elementary lens is changed into a bundle of parallel rays.

Figure 2 shows a gross enlargement of such an elementary lens, whereby the same optical conditions are assumed. The solid lines indicate the bundle of rays which emanates from a point on the axis of the lens, which becomes converted into a bundle of parallel rays by means of the lens. Only a certain portion of the points not on the axis contributes to the useful radiation because the radiation emanated from each point is converted into a bundle of parallel rays, whereby, however, the bundles emanating from different points form an angle with each other. If, for instance, a projection lens appears under an angle W viewed from the lens screen, the radiation of those points only can be utilized which lie within the space angle W viewed from the center point K of the lens curvature. In spite of the fact that points lying within the ranges 6 do not contribute anything, it has been found that a considerable increase in efficiency is nevertheless obtained because a larger space angle of the radiation emanating from points near the axis is utilized, and because a greater density of radiation prevails in this space angle than in the light rays entering the glass.

The optical systems may also have the shapes of concave mirrors so that they reflect to the front the radiation directed to the back. In this case, a still greater total efficiency is obtained. Such a device is shown in Fig. 3. The reference numerals in this figure correspond to those in Fig. 1.

In the tubes, according to Figs. 1 and 3, the plane bottom wall proper may be formed as an optical screen if desired. However, as the wall must have a minimum thickness in order to resist the pressure of the outside atmosphere, and on the other hand, as the screen must usually be very thin, one will usually place the screen in the inside of the tube. An optical projection system proper may form the bottom of the tube. A geometrical screen may be produced, for instance, by impression. As absolute optical accuracy is of no great importance, finishing of the screen will usually be unnecessary. Suitable artificial substances may also take the place of glass.

In special cases of a tube with a mirror screen, it may be preferred not to arrange the axis of the mirrors perpendicularly to the plane of the screen but under a certain angle. The undeflected position of the cathode ray beam may be perpendicular to the plane of the fluorescent screen as in known devices, or it may form an angle with said plane.

The space angle into which the emanating radiation is densified can be varied within wide limits by suitable choice of the optical conditions. It is, for instance, also possible to give the fluorescent screen and the optical screen a spherical curvature so that the axes of all screen elements are directed towards one point. Viewed from this point and its vicinity, the image will appear especially bright. When projecting upon a screen, the projection objective is then preferably arranged in such a manner that its center point coincides with the intersection of the axes of the rays. Such an arrangement is particularly preferable in case the diameter of the projection objective is smaller than the diagonal of the image. Simultaneously, distortion in the image may be eliminated by the curvature. The same could also be accomplished by a plane screen in which the axes of all optical systems form angles with each other. Such a screen, however, is very difficult to produce.

As usual the grain of the fluorescent substance is chosen to be small compared with an elemental area of the image. The fluorescent layer preferably contains only one layer of luminescent particles of high homogeneity.

We claim:

1. A visual image reproducing screen for a cathode ray tube comprising a transparent sheet of material having a thickness substantially equal to the diameter of an elemental area of an image to be formed on said screen, a light emissive coating on one side of said sheet, and a system of light concentrating elements arranged side by side on the other side of said sheet, each individual one of said light concentrating elements having a diameter in the plane of said sheet substantially equal to the diameter of said elemental area of the image to be formed on said screen.

2. A visual image reproducing screen for a cathode ray tube comprising a transparent sheet of material having a thickness substantially equal to the diameter of an elemental area of an image to be formed on said screen, a light emissive coating on one side of said sheet, and a system of light concentrating lenses arranged side by side on the other side of said sheet, each one of said lenses having a diameter substantially equal to the diameter of the elemental area of the image to be formed on said screen.

3. A visual image reproducing screen for a cathode ray tube of the type having an electron scanning beam of incremental cross-sectional area comprising a transparent sheet of material having a thickness less than the diameter of the cross-sectional area of said beam, a light emissive coating on one side of said sheet, and a system of light concentrating elements arranged closely spaced in side by side relation on the other side of said sheet, each of said elements having a diameter less than the diameter of the cross-sectional area of said cathode ray beam.

4. A visual image reproducing screen for a cathode ray tube comprising a transparent sheet of material having a thickness substantially equal to the diameter of an elemental area of an image to be formed on said screen, a light emissive coating on one side of said sheet, and a system of light concentrating elements closely spaced in side by side relation on the other side of said sheet, each of said light concentrating elements having a focal point lying in the plane of said light emissive coating.

5. An image screen for a cathode ray device comprising a transparent sheet of material having a thickness less than the diameter of an elemental area of an image to be formed on said screen, a light emissive coating on one side of said sheet, and a system of lenses closely spaced in side by side relation on the other side of said sheet, each of said lenses having a hexagonal shape with the base thereof parallel to the plane of said light emissive coating, the area of the base of said hexagonal lens being substantially equal to an elemental area of said image to be formed on said screen.

6. An image screen for a cathode ray device comprising a transparent sheet of material having a thickness substantially equal to the diameter of an elemental area of an image to be formed on said screen, a light emissive coating on one side of said sheet, and a system of concave light concentrating mirrors closely spaced in side by side relation on the other side of said sheet, said mirrors reflecting the emitted light of said coating back through said coating to the front of said sheet and each having a diameter substantially equal to the diameter of an elemental area of an image to be formed on said screen.

ERNST RUSKA.
WILHELM REICHEL.
ROLF COLBERG.